Aug. 11, 1959  H. W. COLE, JR  2,898,940
HIGH PRESSURE HOSE
Filed May 13, 1957
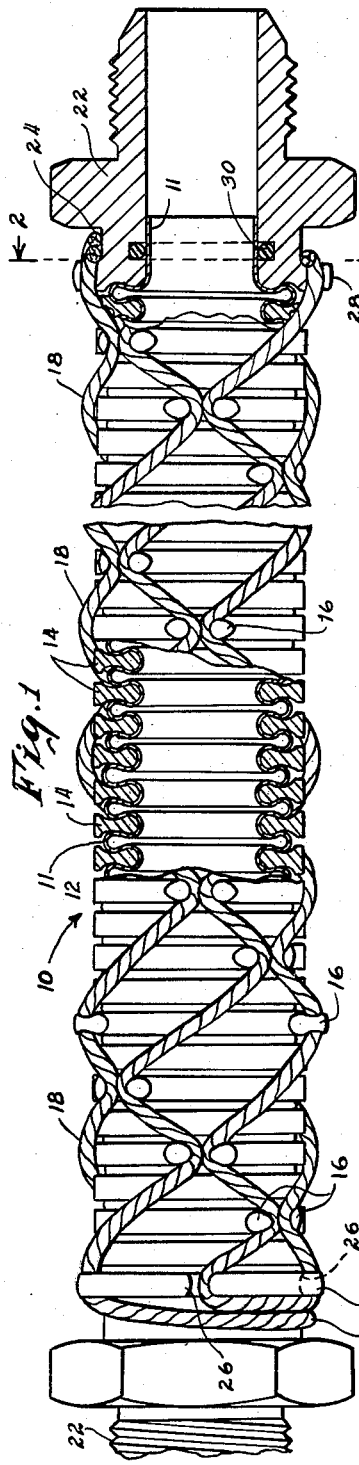
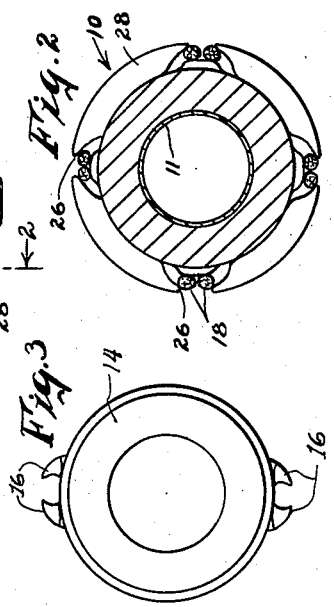
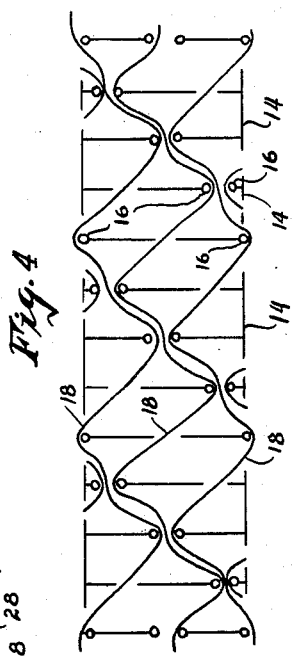
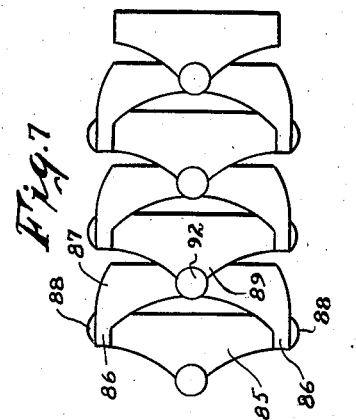
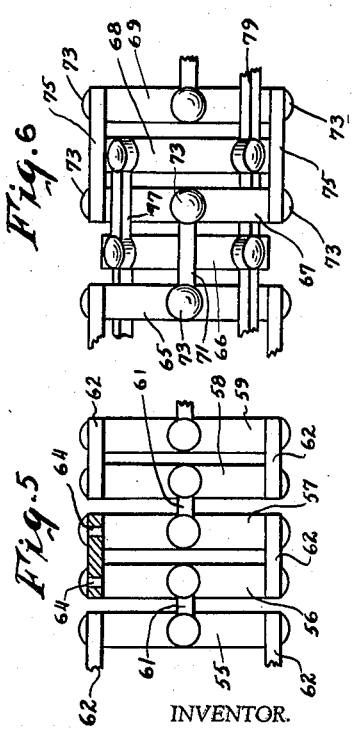
INVENTOR.
Howard W. Cole, Jr.
BY Emery, Whittemore, Sandoe & Dix
ATTORNEYS

2,898,940
HIGH PRESSURE HOSE

Howard W. Cole, Jr., Mountain Lakes, N.J.

Application May 13, 1957, Serial No. 658,816

13 Claims. (Cl. 138—50)

This invention relates to high-pressure flexible hose, and the invention is intended primarily for metal hose.

It has been proposed to strengthen metal hose by the use of an inside cable, or by links, extending lengthwise of the hose along its longitudinal axis. Such hoses can be wrapped to provide radial strength while the inside cable or linkage provides axial restraint; but the inside restraining means decreases the cross section and produces turbulence of flow in addition to mechanical difficulties in the manufacture of the hose.

It is an object of this invention to provide an improved high-pressure, flexible hose of greater flexibility and simpler construction.

To obtain high flexibility, two factors are balanced. An unsupported bellows is unstable in bending, that is, internal pressure causes the bellows or hose to bend further in the direction in which it has started to bend. A single cable stretched between two points has an opposite effect, that is, a force tending to bend the cable is opposed by the catenary action. These two effects are combined in this invention in a way in which they substantially balance one another; the bellows effect tending to produce bending and the cable tending to maintain the hose in a straight line.

It is another object of the invention to provide a high-pressure hose with the longitudinal restraining means located on the outside of the hose and correlated so as to provide, in effect, universal connections between adjacent sections of the hose. More specifically, it is an object of the invention to provide a flexible hose with a plurality of cables as the axial restraining means. This use of a number of smaller cables instead of a single large cable increases the flexibility of the hose and facilitates the manufacture of it.

Other objects, features and advantages of the invention will appear or be pointed out as the description proceeds.

In the drawing, forming a part hereof, in which like reference characters indicate corresponding parts in all the views, Figure 1 is a side view, partly in elevation and partly in section, showing a flexible hose made in accordance with this invention;

Figure 2 is a sectional view taken on the line 2—2 of Figure 1;

Figure 3 is an end view of one of the reinforcing rings used on the hose shown in Figure 1;

Figure 4 is a diagrammatic view showing a modified construction with the cables related to the hose, and to each other, in a different way from that shown in Figure 1;

Figures 5 and 6 are diagrammatic views illustrating various other structures that could be used instead of cables, these views being principally to illustrate the principle of the invention; and Figure 7 is an elevation showing another modified form of the invention with pivoted connections between mechanical parts used in place of the cables shown in Figures 1 and 4.

Figure 1 shows a flexible hose 10 which includes a tube 11 having corrugations 12 extending circumferentially so that the tube is, in effect, a long bellows. In the preferred construction, the tube 11 is made of metal, but the features of the invention can also be applied to tubes of other material when the strength requirements are lower. For highest pressure, the tube 11 is made of steel, but the gauge must be light enough to obtain flexibility with the corrugated construction.

The tube 11 is restrained, against radial expansion or failure, by corrugation-supporting rings 14 located in each of the corrugations 12. These rings 14 are shaped to fit the corrugations 12 and they have peripheral portions that flare outwardly to cover part of the outwardly extending portions of the corrugations. Some space between adjacent rings 14 is essential, however, in order to permit flexing of the tube; and the tube must be strong enough so that the unrestrained sections between the rings 14 can withstand the internal pressure for which the tube is intended. By having the corrugations close together, the unrestrained lengths of tube wall between adjacent rings 14 is kept short.

In the preferred construction, the rings 14 are made of metal, and made of steel for the highest pressure hose, as previously explained. The surfaces of the rings 14, which contact with the wall of the tube 11, are rounded and smooth so as to obtain rolling contact, insofar as possible, during flexing of the tube, and to obtain low friction when any sliding or creeping motion is required.

On some of the rings 14 there are pairs of lugs 16, best shown in Figure 3. These lugs are spaced from one another to permit the passage of cables 18 (Figure 1) between them; and the lugs 16 have their confronting faces curved so as to hold the cables against the peripheral surface of the ring 14 between the lugs 16. In Figure 1, there are lugs 16 on alternate rings 14; and the other rings have smooth peripheral surfaces.

The lugs 16 on each of the rings 14 are located at a different angle, around the circumference of the tube, from the corresponding lugs of the next ring. In the construction shown in Figure 1, there are six runs of cable 18, and the lugs on each successive connected ring are at an angle of 45° to those of the preceding connected ring, as measured around the circumference of the tube. The hose has end fittings 22. There are recesses 26 at angularly spaced locations around the peripheries of the flanges 28 of the end fittings.

Figure 1, at the lower left-hand part of the tube 11, shows a cable 18 extending through lugs 16, through a recess 26 in the flange 28, and then downwardly behind the flange 28 and through another recess 26 indicated by dotted lines, and back between the lugs 16 to form another length of restraining cable along the hose.

In the preferred and illustrated construction, only one length of cable is used for all six strands, so that only two ends of cable are open; and these ends are at the same end of the finished hose and are simply tied together, or otherwise held against displacement with respect to the end fitting.

This use of continuous cable is advantageous for several reasons. One is that it insures full strength of the cables at the fittings 22, and another is that the manufacture of the hose is facilitated by reducing the number of places where the cable has to be secured at the end fittings. From this construction, it will be understood that the expression "plurality of cables," used herein, designates a number of different lengths of cable extending lengthwise of the hose and without any regard as to whether the various lengths may join as a continuous cable at the end fittings.

Each end of the tube 11 extends into the interior of one of the end fittings 22, as shown at the right-hand end of Figure 1. Illustrated is one method of sealing in which an O-ring 30 is located in an annular groove in the fitting 22 and around the outside of the end portion of the tube 11. It is preferred that the tube 11 be bonded to the end fitting 22, but this is not essential since it carries no axial loading.

The cables 18, shown in Figure 1, extend back and forth but have a resultant helical extent around the circumference of the tube. Figure 4 shows a modified construction with eight cables and with no net circumferential extent of the cables around the tube. Elements in Figure 4, corresponding to those in Figure 1, are indicated by the same reference characters. There is no difference in construction other than the cables 18 are laced so that three runs of cable pass through each pair of lugs 16. The blank rings are not shown for clarity of the presentation.

With the modified construction shown in Figure 4, a smaller diameter cable can be used because of the greater number of cables, and thus a greater axial load can be restrained for a given size of cable.

Of more importance, however, is the fact that the cable used in Figure 1 must be securely anchored to each of the rings having the lugs 16 to prevent loading the hose torsionally when it is pressurized. If the cable is allowed to slide through the spaces between the lugs 16, this will lengthen the hose. This results from the fact that each of the cables in Figure 1 has a net helical extent part way around the circumference of the hose. The cables 18 are anchored to the rings 14 by swaging the lugs 16 around the cables 18 where the cables pass between the different pairs of lugs. Other connecting means can be used, such as brazing or welding, but the swaging is performed more easily and has sufficient strength.

With the construction shown in Figure 4, it is not necessary to anchor the cables 18 to the rings 14 because the cables do not have any net helical extent around the circumference, as previously explained. Each cable in Figure 4 weaves back and forth over 90° of the hose circumference for each "universal" unit length of the hose.

The hose can be cut to any desired length by removing the cables 18, severing the hose at a desired convolution, and reforming the end to fit into an end fitting 22. The cable is again laced or threaded through the lugs of the corrugation-supporting rings 14, and the excess length of cable can be cut off before bonding the newly cut end to its end fitting 22.

Instead of connecting the corrugation supporting rings together with cable to prevent axial strain of the hose, the rings can be connected by other kinds of pivotal connections, such as the links shown in Figures 5 and 6. Actually, the constructions shown in Figures 5 and 6 subject the supporting rings to high bending stresses and they are not as strong as the hoses restrained with cables as in Figures 1 and 4, but the links in Figures 5 and 6 illustrate the principle of the invention very clearly.

Figure 5 shows successive supporting rings 55–59 which are similar to the supporting rings 14 of Figures 1 and 4 except that they have no lugs for cables and they are connected together by links 61 and 62 having pivots 64 extending through the ends of the links and into the supporting rings 55–59. There are two links 61, 180° apart around the circumference of the ring 55 and connecting this ring 55 to the next ring 56. Then there are two similar links 62 connecting the ring 56 to the next ring 57.

The links 62 are similar to the links 61, but they are located 90° further around on the circumference of the ring 56. It will be evident that these pivoted links 61 and 62, with their pivot axes at right angles to one another, and normal to the longitudinal axis of the rings, form a universal joint.

The ring 57 is connected to the ring 58 by links 61, this connection being similar to that between the rings 55 and 56. The connection between the rings 58 and 59 is by the links 62, and the same as the connection between the links 56 and 57. Thus the supporting rings 55–59 are restrained against axial movement but have complete omni-directional flexibility as with any crossed axis universal joint.

Figure 6 shows a construction with supporting rings 65–69. The ring 65 is connected to the ring 67 by links 71 spaced 180° apart around the circumferences of the rings 65 and 67. Only the upper link 71 shows in Figure 6 since the other link 71 is directly under it. These links 71 are connected to the rings 65 and 67 by pivot pins 73, and they are similar to the links 61 of Figure 5 except that they are longer and reach across the next ring 66 to join alternate rings 65 and 67.

The ring 67 is connected to the ring 69 by links 75 similar to the links 71 and similarly spanning an intermediate ring 68. Thus the links 65, 67 and 69 form a universally jointed connection. Similarly the intermediate rings 66 and 68 are joined together by links 77; and are joined to other rings, beyond the rings 65 and 69 and not shown in the drawing, by links 79, to form a second universally jointed assembly of rings. The links 77 and 79 are at 90° to one another, and in order to maintain the most uniform distribution of the axial restraint, these links 77 and 79 are located at an angular spacing of 45° from the links 71 and 75 of the other system of rings.

The corrugated tubing into which the rings of Figures 5 and 6 extend are omitted from these figures for greater clearness in the drawing, it being understood that the rings of Figures 5 and 6 fit into the corrugations of the tube in the same way as the rings 14 of Figure 1, and they may be made with similar cross section.

Figure 7 shows another modified construction in which a corrugation supporting ring 85 connects with lugs 86 on an adjacent corrugation supporting ring 87 by means of pivot pins 88 extending through the lugs and into the ring 85. The ring 87 is similarly connected with lugs 89 of the next ring 90 by pivot pins 92 located at a 90° angular spacing from the pivot pins 88. Corresponding links and connections along the system of rings shown in Figure 7 are designated by the same reference characters.

The structure shown in Figure 7 differs from that of Figure 5 in the shape of the supporting rings and the substitution of the lugs with single pivots for the links of Figure 5 with pivots at both ends. As in the case of Figures 5 and 6, the tubing is omitted from the drawing in Figure 7 for greater clearness.

The preferred embodiments and some modifications of the invention have been illustrated and described, but changes and other modifications can be made, and some features can be used in different combinations without departing from the invention as defined in the claims.

What is claimed is:

1. A flexible, high-pressure hose including a corrugated flexible tube with each corrugation extending circumferentially around the tube, an individual supporting ring in each of the corrugations and extending around the full circumference of the tube for restraining the tube against radial strain, and tension elements connecting different rings and on opposite sides of the hose, and other tension elements connecting others of said rings on opposite sides of the hose but at different angular positions around the circumference of the hose from the first tension elements to obtain universal flexing movement of the hose, all of the tension elements being between peripheral portions of the rings that extend beyond the convolutions of the tube.

2. The high-pressure hose described in claim 1 and in which the tension elements connecting each ring to another ring on one side thereof are angularly spaced from its tension elements connecting to another ring on the other side thereof by an angle of approximately 90°.

3. The high-pressure hose described in claim 1 and in which each of the supporting rings has a cross section shaped to substantially fill the space in the inwardly depressed recesses formed by the corrugations of the tube.

4. The high-pressure hose described in claim 3 and in which the rings extend radially beyond the maximum diameter of the tube, and the tension elements connecting the rings are connected with the peripheral portions of the rings.

5. The high-pressure hose described in claim 3 and in which there are pairs of lugs extending from the circumferential surfaces of the different rings, and the tension elements are runs of cable woven back and forth through clearances between the lugs, and there are end fittings at opposite ends of the hose and to which the ends of the different runs of cable are anchored.

6. The high-pressure hose described in claim 1 and in which there are lugs extending radially from the rings and the tension elements are runs of cable woven back and forth past the lugs.

7. The high-pressure hose described in claim 6 and in which the cable is rigidly secured to the lugs.

8. The high-pressure hose described in claim 6 and in which different portions of the runs of cable have a helical extent in one direction and other portions of the runs of of the same cable have helical extent in the other direction and the helical extents of the cable in the different directions are substantially equal so that the opposite ends of the run of cable are at corresponding angular locations around the circumference of the hose.

9. The flexible, high-pressure hose described in claim 1 and in which there are pairs of lugs on opposite sides of the different supporting rings, the pairs of lugs being at diametrically opposite locations on the ring, the pairs of lugs on successively spaced rings being at different angular locations around the longitudinal axis of the hose, and there are end fittings at opposite ends of the hose, each of the fittings having a passage therethrough into which a reduced-diameter end of the tube fits as a telescoping fit, sealing means between the outside of the tube and the wall of the fitting passage into which the tube extends, lugs extending radially outward from an outside surface of the fitting which is substantially equal in diameter to the outside diameter of the corrugated portion of the tube, and the tension elements connecting the different rings include at least one wire cable which weaves back and forth between pairs of lugs during a run of the cable from one end fitting to the other, the cable extending around a lug of the end fitting to form a reverse bend and then weaving back and forth between spaced lugs of the supporting rings in another run of the cable to the other end fitting, the cable extending around a lug of said other end fitting to form another reverse bend, then weaving back and forth between lugs of the supporting rings, and in like manner forming a plurality of runs spaced around the circumference of the hose, each of the opposite ends of the cable being securely bonded to an end fitting of the hose.

10. A high pressure hose including a flexible tube and restraining means around the outside of the tube including a plurality of different restraining elements axially spaced from one another along the length of the tube and preventing bursting of the tube, and an external system of tension elements connecting the axially spaced restraining elements, said system including some tension elements that are joined to certain of the axially spaced restraining elements by connections having some pivotal movement and at stations along the length of the hose and at corresponding locations around the circumference of the hose, and said system including other tension elements jointed to others of the axially-spaced restraining elements by connections having some pivotal movement and at stations along the length of the hose and at corresponding locations around the circumference of the hose, and said system including other tension elements joined to others of the axially-spaced restraining elements by connections having some pivotal movement and at stations intermediate the first stations and at locations angularly spaced around said circumference from the first stations.

11. The high pressure hose described in claim 10, and in which there is an element of the restraining means intermediate the successive restraining elements that are connected by the external system of tension elements, and a second external system of tension elements connecting the intermediate restraining elements, the second external system being similar to the first but with its connections to the restraining elements circumferentially displaced therefrom by an angle of approximately forty-five degrees.

12. The high pressure hose described in claim 10, and in which the tension elements are links having means at opposite ends for holding the restraining elements against axial movement away from one another.

13. The high pressure hose described in claim 10, and in which the tension elements are links that span intervening restraining elements and that have means at their opposite ends for holding alternate restraining elements against axial movement away from one another.

References Cited in the file of this patent

UNITED STATES PATENTS 1,971,928     Zallea _____ Aug. 28, 1934